No. 611,689. Patented Oct. 4, 1898.
E. KLAHN.
BALL RETAINING DEVICE FOR BALL BEARINGS.
(Application filed May 4, 1898.)
(No Model.)
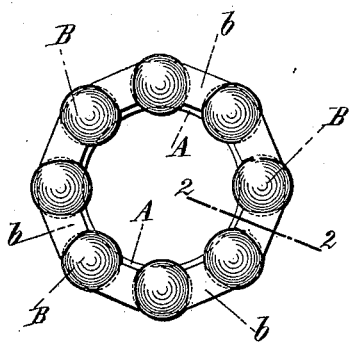
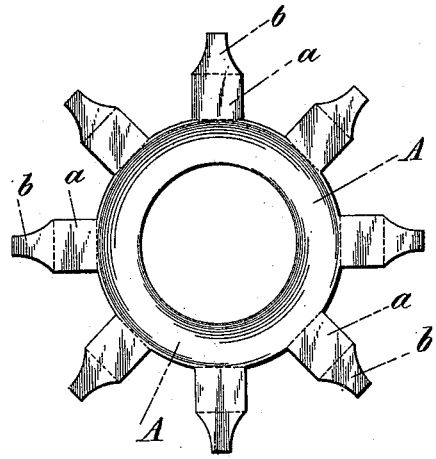
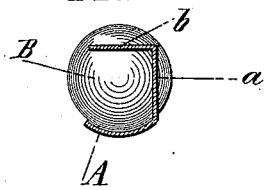
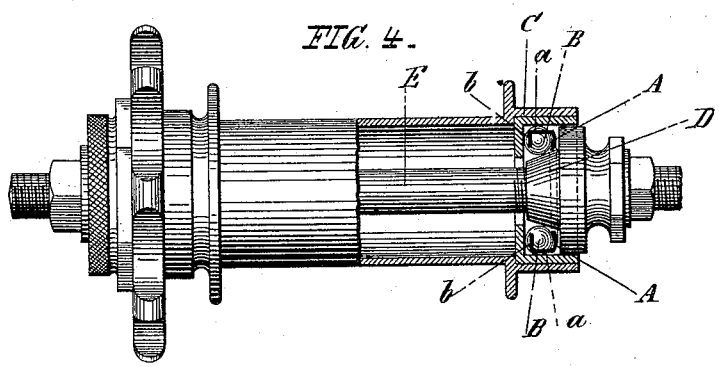
WITNESSES:
INVENTOR

UNITED STATES PATENT OFFICE.

EMIL KLAHN, OF WEST HOBOKEN, NEW JERSEY.

BALL-RETAINING DEVICE FOR BALL-BEARINGS.

SPECIFICATION forming part of Letters Patent No. 611,689, dated October 4, 1898.

Application filed May 4, 1898. Serial No. 679,721. (No model.)

*To all whom it may concern:*

Be it known that I, EMIL KLAHN, a citizen of the United States, and a resident of West Hoboken, in the county of Hudson and State of New Jersey, have invented certain new and useful Improvements in Ball-Retaining Devices for Ball-Bearings, of which the following is a specification.

My invention has reference to improvements in ball-retaining devices for ball-bearings, and has for its purpose to provide a device by which the balls in the bearings are kept separate from each other and the friction therein is prevented. These objects are attained by the construction shown in the accompanying drawings, in which—

Figure 1 is a top view of the improved ball-retaining device; Fig. 2, a section on line 2 2 of Fig. 1; Fig. 3, a blank of which the device is made; and Fig. 4, an illustration of a hub with one end in section, showing the manner in which the ball-retaining device is applied.

Similar letters of reference indicate corresponding parts.

A in the drawings represents a ring-shaped concave base of sheet metal which has outwardly-radiating straight flaps $a$, provided with extensions $b$, the opposite sides of which latter are inwardly curved. The flaps $a$ are upwardly bent and stand in right or nearly right angles to the base. The extensions $b$ are bent toward the center of the ring-shaped base and have a location parallel or nearly parallel to the latter.

The balls B, of corresponding shape, are placed into the spaces created by the flaps $a$ and the extensions $b$ and held on the base by the side edges of the flaps and the outer pointed ends of the extensions. The said pointed ends of the extensions, which are obtained by the curvatures of the latter, prevent the balls, which can freely revolve in the device, from being removed therefrom in the inner direction, while the edges of the flaps hinder the balls from being removed to the outside.

The ball-retaining devices are applied to a ball-bearing as follows: The devices are placed into the cups C of the hub, and the cones D are then screwed upon the ends of the shaft E, so that the devices are inclosed in the chambers created by the said cups and cones, and the balls held in the devices come in close contact with the portions of the balls projecting beyond the retaining-flaps and their extensions. The cones of the shaft can then freely rotate within the cups of the bearing or the cups on the cones, as the case may be.

In Fig. 4 only one end of the hub is shown as provided with the ball-retaining device.

It is a well-known fact that in the common ball-bearings friction is often caused by the circumstance that the balls are not precisely of the same diameter, whereby a sliding instead of a revolving motion of one or more balls is caused, so that the bearings are worn out in a comparatively short time. Such friction cannot occur in ball-bearings with my improved ball-retaining devices, as such balls which are of too small a diameter will be carried along without causing any friction or other injury.

Having thus described my invention, I claim as new and desire to secure by Letters Patent—

1. A ball-retaining device for ball-bearings consisting of a ring-shaped base having radiating flaps with laterally-curved extensions, the flaps being upwardly and the curved extensions being sidewardly bent in the direction to the center of the base, in combination with balls held on the base in the spaces created by the said flaps and their extensions, substantially as set forth.

2. A ball-retaining device for ball-bearings consisting of a ring-shaped concave base having radiating flaps with laterally-curved extensions, the flaps being upwardly, and the curved extensions being sidewardly bent in the direction to the center of the base, in combination with balls located in the concavity of the base between the said flaps and curved extensions, substantially as set forth.

3. A blank for making a ball-retaining device for ball-bearings consisting of a ring-shaped base, A having outwardly-radiating flaps $a$ with laterally-curved extensions $b$, as shown and described.

Signed this 2d day of May, A. D. 1898.

EMIL KLAHN.

Witnesses:
 M. N. POLLOCK,
 J. B. FOSTER.